(12) United States Patent
Chinnam et al.

(10) Patent No.: US 8,909,715 B2
(45) Date of Patent: Dec. 9, 2014

(54) REFERENCES TO HISTORY POINTS IN A CHAT HISTORY

(75) Inventors: Kotaiah Chinnam, Bangalore (IN); Eric Philip Fried, Austin, TX (US); Vijayasekhar Mekala, Nellore District (IN); Vamshi Krishna Thatikonda, KarimNagar (IN)

(73) Assignee: International Business Machines Corporation, Armonk, NY (US)

(*) Notice: Subject to any disclaimer, the term of this patent is extended or adjusted under 35 U.S.C. 154(b) by 685 days.

(21) Appl. No.: 12/198,916

(22) Filed: Aug. 27, 2008

(65) Prior Publication Data

US 2010/0057854 A1 Mar. 4, 2010

(51) Int. Cl.
G06F 15/16 (2006.01)
G06F 3/00 (2006.01)
G06Q 10/10 (2012.01)

(52) U.S. Cl.
CPC .................................... G06Q 10/10 (2013.01)
USPC ............................ 709/206; 709/204; 715/751

(58) Field of Classification Search
USPC ....................................................... 709/206
See application file for complete search history.

(56) References Cited

U.S. PATENT DOCUMENTS

| | | | |
|---|---|---|---|
| 7,305,627 B2 | 12/2007 | Tannenbaum | |
| 2003/0036393 A1* | 2/2003 | Kanefsky | 455/466 |
| 2004/0236774 A1* | 11/2004 | Baird et al. | 707/100 |
| 2004/0243627 A1* | 12/2004 | Jensen et al. | 707/104.1 |
| 2005/0132298 A1* | 6/2005 | Lueckhoff et al. | 715/758 |
| 2006/0053195 A1* | 3/2006 | Schneider et al. | 709/204 |
| 2006/0080432 A1 | 4/2006 | Spataro et al. | |
| 2006/0085515 A1* | 4/2006 | Kurtz et al. | 709/207 |
| 2006/0212583 A1 | 9/2006 | Beadle et al. | |
| 2006/0265381 A1* | 11/2006 | Altaf et al. | 707/10 |
| 2007/0124387 A1 | 5/2007 | Galloway | |
| 2007/0168448 A1* | 7/2007 | Garbow et al. | 709/207 |
| 2007/0198648 A1 | 8/2007 | Allen et al. | |
| 2007/0300169 A1* | 12/2007 | Jones et al. | 715/764 |
| 2008/0028027 A1* | 1/2008 | Jachner | 709/206 |
| 2008/0065761 A1* | 3/2008 | Wilson | 709/224 |
| 2008/0144784 A1* | 6/2008 | Limberg | 379/88.14 |
| 2008/0215678 A1* | 9/2008 | Coletrane et al. | 709/204 |
| 2008/0222536 A1* | 9/2008 | Berstis et al. | 715/753 |
| 2008/0301250 A1* | 12/2008 | Hardy et al. | 709/207 |
| 2009/0094343 A1* | 4/2009 | Mehrotra et al. | 709/207 |
| 2009/0198779 A1* | 8/2009 | Agrawal et al. | 709/206 |

* cited by examiner

Primary Examiner — Glenton B Burgess
Assistant Examiner — Angela Nguyen
(74) Attorney, Agent, or Firm — Yee & Associates, P.C.; Damion Josephs

(57) ABSTRACT

A computer-implemented method for managing messages. Responsive to receiving a message at a data processing system, wherein the message comprises only a number of message identifiers and metadata identifying the message as pointing to a number of messages in a message history stored in the data processing system, the number of messages in the message history on the data processing system is identified to form an identified number of messages. A presence of the identified number of messages in the message history is displayed on a display in the data processing system.

19 Claims, 5 Drawing Sheets

REFERENCES TO HISTORY POINTS IN A CHAT HISTORY

BACKGROUND OF THE INVENTION

1. Field of the Invention

The present disclosure relates generally to an improved data processing system and in particular to a method and apparatus for processing data. Still more particularly, the present disclosure relates to a computer-implemented method, apparatus, and computer program code for referring to prior points in a chat history.

2. Description of the Related Art

The Internet is a global network of computers and networks joined together by means of gateways that handle data transfer and the conversion of messages from a protocol of the sending network to a protocol used by the receiving network. On the Internet, any computer may communicate with any other computer with information traveling over the Internet through a variety of languages, also referred to as protocols. The number of protocols used on the Internet is called transmission control protocol/Internet Protocol (TCP/IP).

The Internet has revolutionized both communications and commerce, and has been a source of both information and entertainment. For many users, email is a widely used format to communicate over the Internet. Additionally, the Internet is also used for real-time voice conversations.

Another form of communications commonly used over the Internet is instant messaging. Instant messaging is a form of real-time communication between two or more people based on the typing of text. The typed text may be sent over the Internet to allow people to communicate with each other. Instant messaging is different from other types of communication such as email, because of the perceived synchronicity of the communication by the user. With instant messaging, the messages sent between users may typically occur in real time. With instant messaging systems, communication may provide immediate receipt of acknowledgment or reply of messages.

Typically, users are online at the same time and the intended recipient is in a state indicating that they are willing to receive messages. Real time with instant messaging means that the messages are sent as quickly as possible from one computer to another computer without an intended delay at an intervening computer such as with email. The messages sent back and forth between users during a communication session are referred to as a chat history.

BRIEF SUMMARY OF THE INVENTION

The illustrative embodiments provide a computer-implemented method, apparatus, and computer program code for managing messages. A number of messages in the message history on the data processing system is identified to form an identified number of messages in response to receiving a message at a data processing system, wherein the message comprises a number of message identifiers and metadata identifying the message as pointing to a number of messages in a message history store in the data processing system. A presence of the identified number of messages in the message history is displayed on a display in the data processing system.

DETAILED DESCRIPTION OF THE INVENTION

Figure 1:
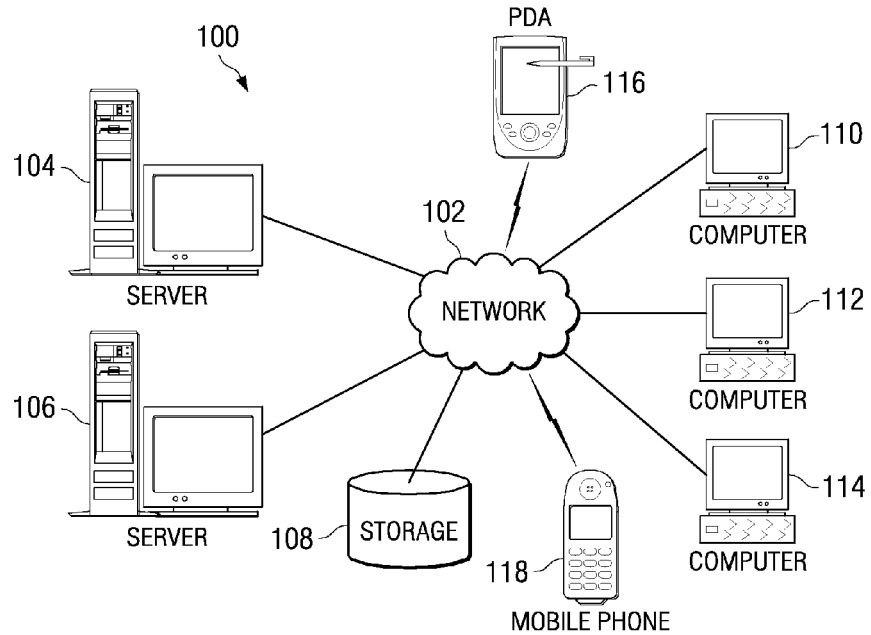
FIG. 1 depicts a pictorial representation of a network of data processing systems in which illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium or media may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer usable or computer readable medium may be any medium that can contain, store, communicate, propagate, or transport the program for use by or in connection with the instruction execution system, apparatus, or device. The computer usable medium may include a propagated data signal with the computer usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer or other programmable data processing apparatus to function in a particular manner, such that the instructions stored in the computer readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 2:
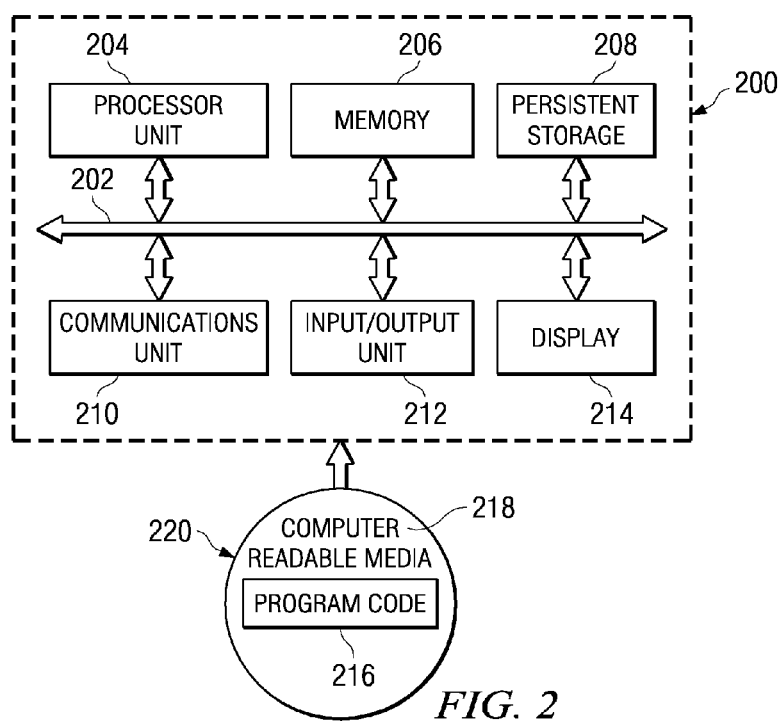
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, computer 110, computer 112, computer 114, personal digital assistant (PDA) 116, and mobile phone 118 are examples of clients that connect to network 102. In the depicted example, server 104 provides data, such as boot files, operating system images, and applications to computer 110, computer 112, computer 114, personal digital assistant 116, and mobile phone 118. Computer 110, computer 112, computer 114, personal digital assistant 116, and mobile phone 118 may execute messaging programs, such as email and instant messaging applications, and are clients to server 104 in this example. Network data processing system 100 may include additional servers, clients, and other devices not shown.

Program code located in network data processing system 100 may be stored on a computer recordable storage medium and downloaded to a data processing system or other device for use. For example, program code may be stored on a computer recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. As used herein, a data processing system is a device that may execute program code. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a number of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer-implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code. In some illustrative embodiments, program code 216 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 216 may be a server computer, a client computer, or some other device capable of storing and transmitting program code 216.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The different illustrative embodiments recognize that a user may desire to refer another user in a chat session to a previous message in the chat history. The chat history is a history of messages between users in a conversation. The different illustrative embodiments recognize that currently, a user scrolls back within the chat history in a window to find a message. This message is then copied and pasted into a current message in a send window to reiterate or represent the message to the other user. The different illustrative embodiments recognize that these types of currently used processes can be cumbersome and inconvenient.

The different illustrative embodiments recognize that copying and pasting prior messages in a chat history and resending those messages use up additional resources. These resources include, for example, bandwidth for sending the information to the other users, additional room in a chat history for both users, and other resources. Further, the illustrative embodiments recognize that these types of processes for representing a prior message also may lose the relevant context from the previous messages.

Thus, the different illustrative embodiments provide a method, apparatus, and computer usable program code for managing messages. In response to receiving a message at a data processing system in which the message comprises a number of message identifiers and metadata identifying the message as pointing to a number of messages in a chat history stored in the data processing system, the number of messages is identified in the chat history on the data processing system to form an identified number of messages. A presence of the identified number of messages in the history is displayed on a display device in the data processing system. A number as used herein refers to one or more items. For example, a number of messages is one or more messages in these examples.

Figure 3:
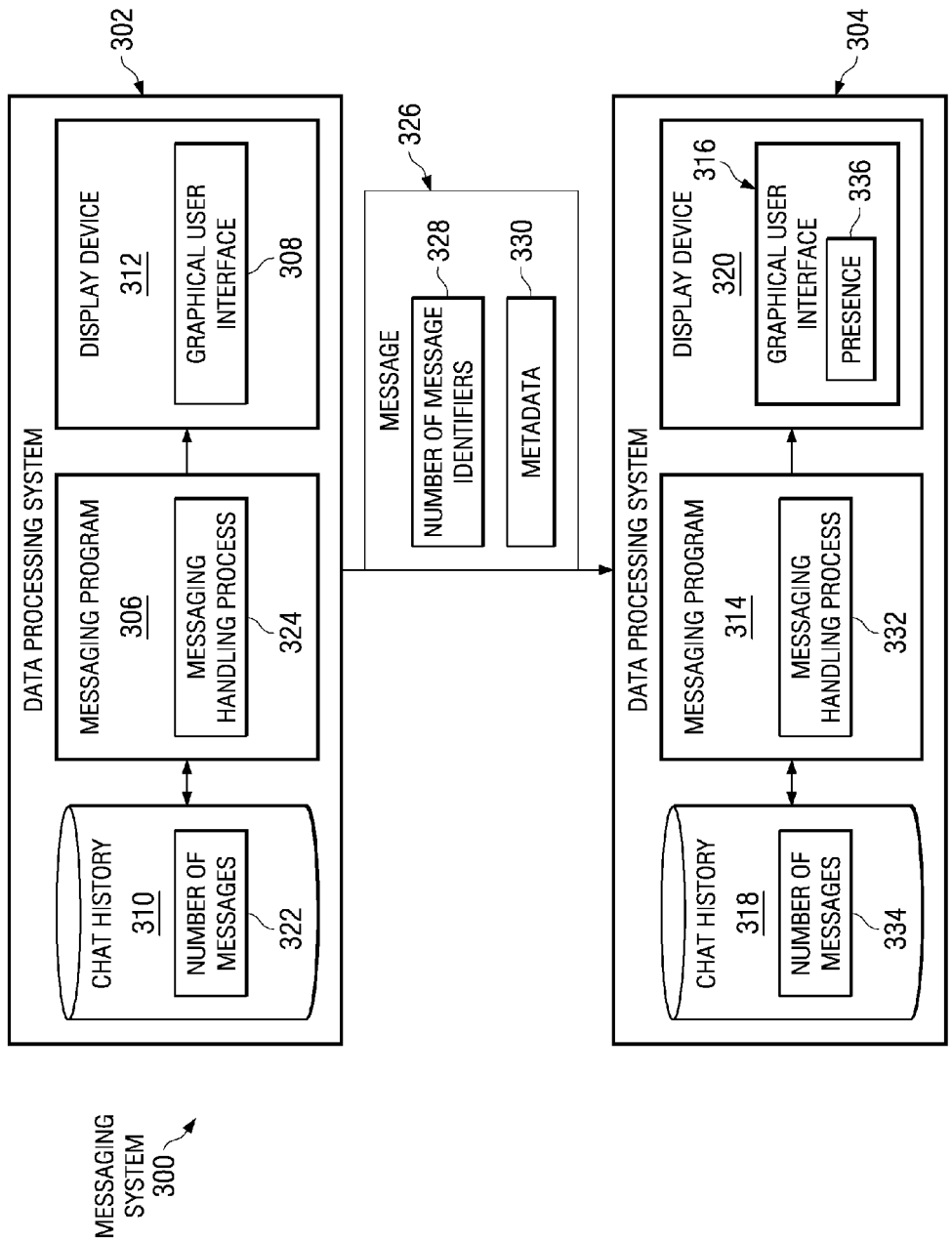
FIG. 3 is a block diagram illustrating a messaging system in accordance with an illustrative embodiment.

With reference now to FIG. 3, a block diagram illustrating a messaging system is depicted in accordance with an illustrative embodiment. In this example, messaging system 300 is an example of a messaging system that may be implemented in an environment such as, for example, network data processing system 100 in FIG. 1. Messaging system 300 includes data processing system 302 and data processing system 304. Data processing system 302 and data processing system 304 may be implemented using hardware such as that illustrated for data processing system 200 in FIG. 2. Data processing system 302 and data processing system 304 may take various forms. For example, these data processing systems may be any of a mobile phone, a personal digital assistant, a computer, or some other computing device.

Data processing system 302 has messaging program 306, graphical user interface 308, chat history 310 and display device 312. Data processing system 304 includes messaging program 314, graphical user interface 316, chat history 318, and display device 320.

Messaging program 306 and messaging program 314 exchange messages during a communication session between two users. The different messages exchanged between the users may be stored in chat history 310 and chat history 318. Further, chat history 310 and chat history 318 may also include archived conversations between users.

A first user at data processing system 302 may interact with graphical user interface 308 to send messages that are then displayed to a second user through graphical user interface 316 at data processing system 304. The handling of the messages in these examples is provided by messaging program 306 and messaging program 314. In these different illustrative embodiments, a user may scroll up in the chat history displayed on graphical user interface 308 to view number of messages 322 within chat history 310.

Once a user has identified number of messages 322, the user may initiate indicating a presence of these messages using message handling process 324. The initiation of this handling by message handling process 324 may be performed in a number of different ways. For example, a user may right-click a menu option and select an entry such as "flag message for other chat participant". In other illustrative embodiments, the user may press a function key or a control and up key simultaneously to initiate reiterating or emphasizing number of messages 322 to the user at data processing system 304.

In these different illustrative embodiments, message handling process 324 does not resend the messages from data processing system 302 to data processing system 304. Instead, identifiers for number of messages 322 located in chat history 310 are sent. Message handling process 324 creates message 326 and places the identified identifiers into message 326 as number of message identifiers 328. Message identifiers are currently used in various messaging systems to uniquely identify messages in a chat session. Number of message identifiers 328 are identifiers for number of messages 322 within chat history 310.

Additionally, message handling process 324 also places metadata 330 into message 326. Metadata 330 is data identifying number of messages 322 as message identifiers for use in identifying corresponding messages in a chat history. In other words, metadata 330 identifies message 326 as a message that is to be processed by a message handling process that supports reemphasizing, representing and/or pointing back to previous messages.

Message handling process 324 sends message 326 to data processing system 304. Message handling process 332 in messaging program 314 processes message 326. Message handling process 332 recognizes message 326 as a message for referring back to previous messages in chat history 318 based on metadata 330.

Message handling process 332 locates number of messages 334 in chat history 318 using number of identifiers 328. Number of messages 334 is a copy of number of messages 322 in chat history 310.

Message handling process 332 displays presence 336 within graphical user interface 316 to point the user to number of messages 334. Presence 336 may be, for example, a display of the messages from chat history 318, a link allowing the user to display the messages, a pop-up window displaying number of messages 334, a scrolling of the current window in graphical user interface 316 back to the location of number of messages 334 in the conversation, a splitting of the window within graphical user 316 to display number of messages 334, with another portion of the window retaining the normal, most recent view of messages. Of course, these types of implementations of presence 336 are provided for purposes of illustrating some mechanisms for presence 336 and not intended to limit the manner in which other illustrative embodiments may implement presence 336.

Presence 336 may provide an indicator that allows the user to initiate a retrieval of number of messages 334 for presentation on display device 320. Alternatively, the retrieval of number of messages 334 may be automatic with presence 336 being a presentation of number of messages 334.

The retrieval of messages may be performed using a number of different ways depending upon the particular implementation. The form of presentation using presence 336 may depend on user preferences, location of the message within chat history 318, and other suitable factors. For example, if a message is older than some number of messages, a control such as a hyperlink or button may be presented to allow the user to retrieve the message. Alternatively, if the message is older than some number of messages, a pop-up window may be used to display number of messages 334.

In the different illustrative embodiments, message handling process 324 may resend number of messages 322 rather than sending message 326 if message handling process 332 does not support the feature for referring back to previous messages.

The illustration of messaging system 300 in FIG. 3 is provided for purposes of presenting one manner in which different illustrative embodiments may be implemented. The presentation of messaging system 300 is not meant to imply architectural or physical limitations to the manner in which other embodiments may be implemented. For example, in other illustrative embodiments, three data processing systems may be present in which three users are participating in a communication session in which messages are exchanged. In still other embodiments, a server may be present for relaying messages between data processing system 302 and 304. Also, in other illustrative embodiments, messaging program 306 and messaging program 314 may be located on a server with graphical user interface 308 and graphical user interface 316 remain on data processing system 302 and data processing system 304, respectively.

Figure 4:
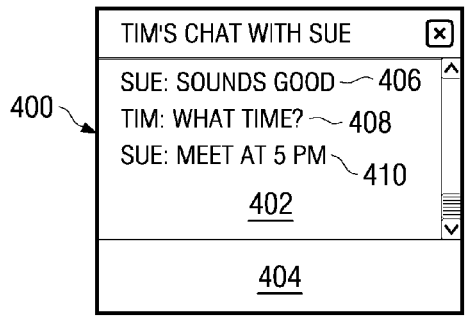
FIG. 4 is an illustration of a messaging window in accordance with an advantageous embodiment.
Figure 5:
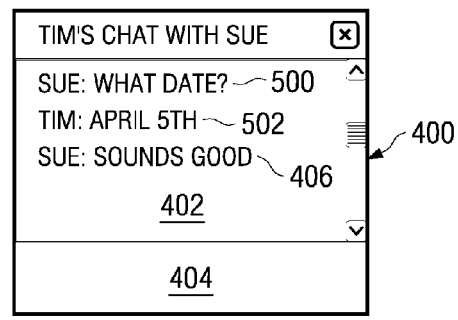
FIG. 5 is an illustration of a messaging window in which a message is selected for re-presentation in accordance with an illustrative embodiment.

With reference to FIGS. 4-9, illustrations of messaging windows are depicted in accordance with an advantageous embodiment. FIGS. 4 and 5 illustrate windows in which a user may select messages for re-emphasis or presentation. FIGS. 6-9 are examples of windows in which a re-presentation of a message may be generated by a recipient of a message containing metadata indicating that a re-presentation of a number of prior messages should occur.

With reference now to FIG. 4, an illustration of a messaging window is depicted in accordance with an advantageous embodiment. In this example, messaging window 400 includes recent message section 402 and message creation section 404. Messaging window 400 is an example of a window displayed by a messaging program such as, for example, messaging program 306 in FIG. 3. For example, messaging window 400 may be a window displayed by graphical user interface 308 in FIG. 3.

Recent message section 402 contains the most recently exchanged messages. A number of messages within recent message 402 may vary depending on the size of window 400. Message creation section 404 provides an interface for a user to create and send a message. Messaging window 400 is an example of a messaging window that may be used to point back to prior messages in accordance with the different illustrative embodiments. In this example, recent message section 402 shows messages 406, 408, and 410.

With reference now to FIG. 5, an illustration of a messaging window in which a message is selected for re-presentation is depicted in accordance with an illustrative embodiment. A message that is pointed back to for re-presentation or viewing is also called a referred-to message. In FIG. 5, the user has scrolled back in the chat history in recent message section 402 to message 500 and message 502. In the different illustrative embodiments, the user may select message 502 to form a number of messages for reemphasis or representation by one or more users during the communication session. The number of messages for reemphasis or re-presentation is also referred to as a number of referred-to messages.

In these examples, message 502 may be selected through a selection of message 502 and a command. The selection of message 502 may be performed in a number of ways, such as, for example, a mouse-click, a function key, a plurality of keys, or some other means of selection. Also, the command may be initiated in different ways. For example, a menu, a function key, or a plurality of keys may be used to initiate the process to refer back to this message during the communication session.

Figure 6:
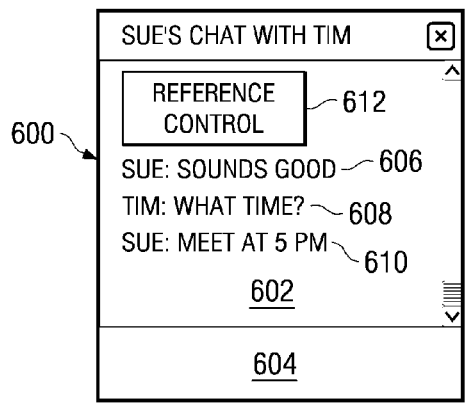
FIG. 6 is an illustration of a messaging window in accordance with an illustrative embodiment.

With reference now to FIG. 6, an illustration of a messaging window is depicted in accordance with an illustrative embodiment. In this example, messaging window 600 has recent message section 602 and message creation section 604. Messaging window 600 is an example of a messaging window located at another client that is part of a messaging session with the client displaying messaging window 400. Messaging window 600 is an example of a messaging window that may be generated by messaging program 314 in FIG. 3 and presented in graphical user interface 316 in FIG. 3.

As can be seen in this example, messages 606, 608, and 610 are displayed within recent message section 602. Messages 606, 608, and 610 are copies of messages 406, 408, and 410 in FIG. 4. In this example, reference control 612 is displayed within messaging window 600 to indicate that a previous message should be viewed by the user. Reference control 612 may be, for example, a button, a link, or some other control that may be used to present a message.

Figure 7:
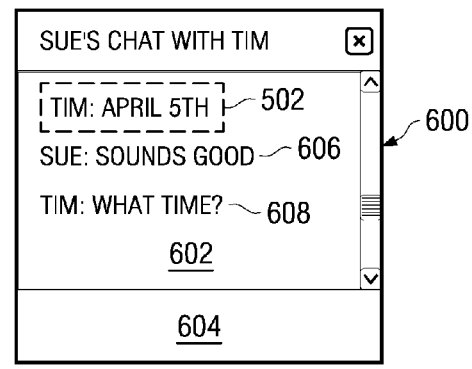
FIG. 7 is a messaging window with a referred-to message in accordance with an illustrative embodiment.

With reference now to FIG. 7, a messaging window with a referred-to message is depicted in accordance with an illustrative embodiment. In this example, message 502 is a referred-to message presented to the user within recent message section 602 in messaging window 600. This presentation may be performed by scrolling back through the messages to message 502. In other advantageous embodiments, if message 502 is already present within recent message section 602, message 502 may be identified using a graphical indicator. For example, message 502 may be highlighted, displayed in a different color from other messages, or associated with some other graphical indicator.

Figure 8:
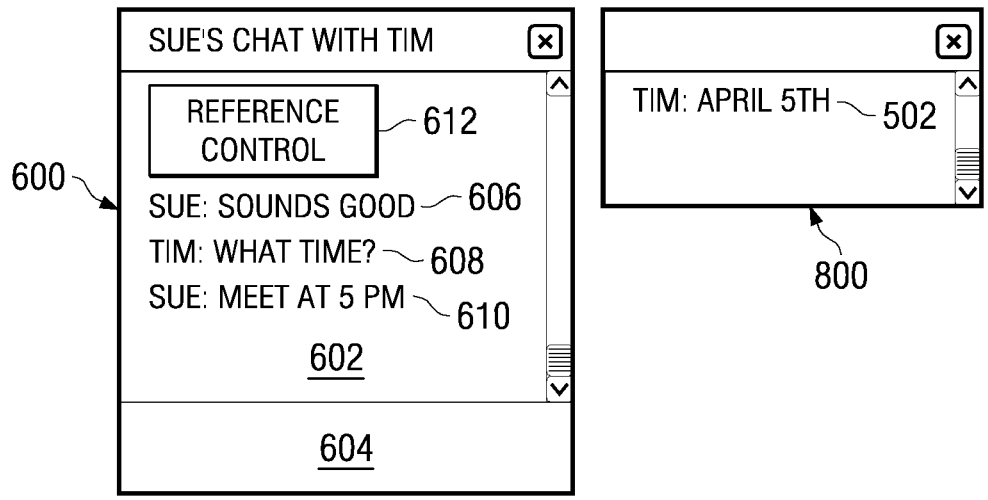
FIG. 8 is a display of a referred-to message in accordance with an illustrative embodiment.

With reference now to FIG. 8, a display of a referred-to message is depicted in accordance with an illustrative embodiment. In this example, pop-up window 800 displays message 502, while messaging window 600 remains in its current form without changing or scrolling.

Figure 9:
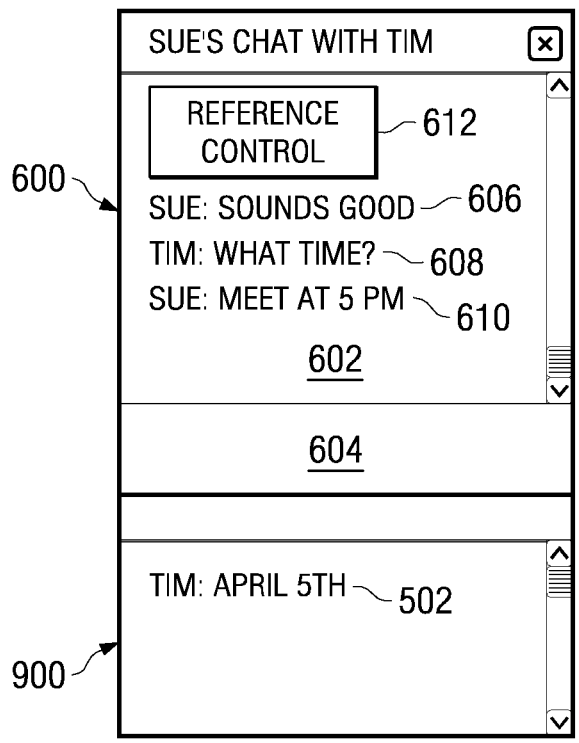
FIG. 9 is a diagram illustrating the presentation of a referred-to message in a split window in accordance with an illustrative embodiment.

With reference now to FIG. 9, a diagram illustrating the presentation of a referred-to message in a split window is depicted in accordance with an illustrative embodiment. In this example, window 600 is modified to become a split window in which message 502 is displayed within referred-to message section 900.

The illustration of referred-to messages in FIGS. 7-9 may be performed in response to a selection of a control such as, for example, reference control 612 in FIG. 6. In other advantageous embodiments, referred-to message 502 may present automatically upon receiving a message identifying referred-to message 502.

Figure 10:
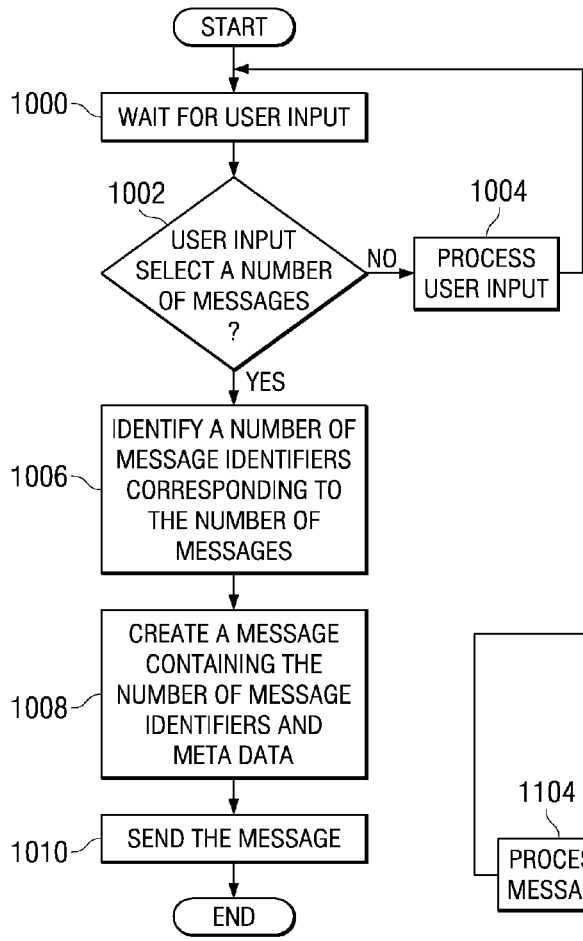
FIG. 10 is a flowchart of a process for selecting a number of messages in accordance with an advantageous embodiment.

With reference now to FIG. 10, a flowchart of a process for selecting a number of messages is depicted in accordance with an advantageous embodiment. The process illustrated in FIG. 10 may be implemented in a software component such as message handling process 324 in FIG. 3.

The process begins by waiting for user input (step 1000). Once a user input has been received, a determination is made as to whether the user input selects a number of messages as a number of referred-to messages (step 1002). If the user input does not select the number of messages as a number of referred-to messages, the user input is processed (step 1004). Step 1004 may perform any other processing that may occur. For example, the processing of user input may be entering text, copying text, selecting a new communication session, or some other user input. The process then returns to step 1000.

If the user input does select a number of messages as referred-to messages, the process identifies a number of message identifiers corresponding to the number of messages (step 1006). The process then creates a message containing the number of message identifiers and metadata (step 1008). The new message created in step 1008 may be, for example, message 326 in FIG. 3. The process then sends the message (step 1010), with the process terminating thereafter.

Figure 11:
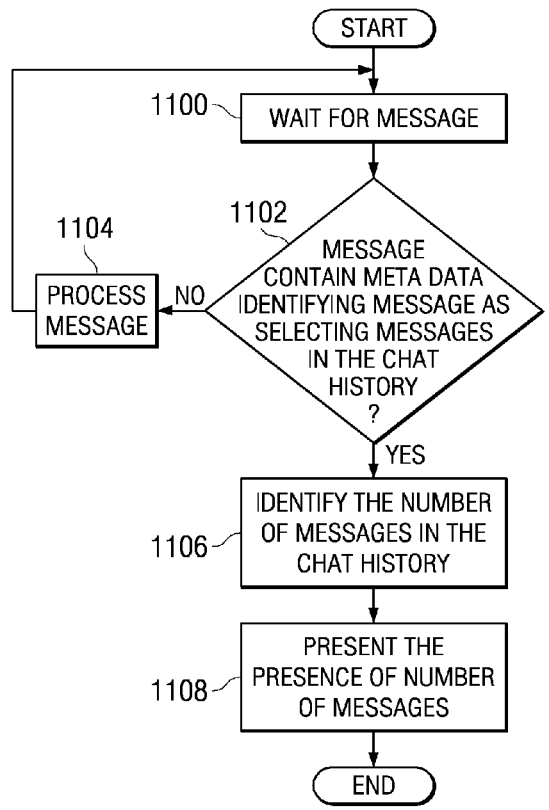
FIG. 11 is a flowchart of a process for displaying a referred-to message in accordance with an illustrative embodiment.

With reference now to FIG. 11, a flowchart of a process for displaying a referred-to message is depicted in accordance with an illustrative embodiment. The process illustrated in FIG. 11 may be implemented in a software component such as, for example, message handling process 332 in FIG. 3.

The process begins by waiting for a message (step 1100). Once a message is received, a determination is made as to whether the message contains metadata identifying the message as selecting messages in the chat history (step 1102). If the message does not contain the metadata identifying the message as one selecting messages in a chat history for presentation, the message is then processed (step 1104). This processing may be normally performed by the message handling process. For example, the message may contain a message generated by the user for presentation. As another example, the message may be a request for a new chat session. The process then returns to step 1100 as described above.

If the message contains metadata identifying the message as selecting messages in the chat history, the number of messages are identified in the chat history (step 1106). Thereafter, the presence of the number of messages is presented (step 1108), with the process terminating thereafter. As described above, the presence of the number of messages may be implemented in a number of different ways. For example, a control such as a button or a link, may be displayed indicating that a number of referred-to messages may be viewed. In other illustrative embodiments, the referred-to messages may be automatically presented using various mechanisms such as those illustrated in FIGS. 7-9.

Thus, the different illustrative embodiments provide a computer-implemented method, apparatus, and computer program code for managing messages. Responsive to receiving a message at a data processing system that contains a number of message identifiers and metadata identifying messages pointing to a number of messages in a chat history stored in a data processing system, the number of messages is identified. Thereafter, the presence of the number of identified messages in the history is displayed on a display device in the data processing system.

In this manner, the different illustrative embodiments provide a capability to refer back to previous messages without having to resend prior messages. Further, the different illustrative embodiments provide a capability to present these messages without losing the context of the current conversation that may occur when messages are retransmitted.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer usable or computer readable medium providing program code for use by or in connection with a computer or any instruction execution system. For the purposes of this description, a computer usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method for managing messages, the computer-implemented method comprising:
   receiving a message at a data processing system, wherein the message comprises a number of message identifiers and a received metadata, wherein each of the message identifiers uniquely identifies a respective prior message in a message history representative of a real-time communication and wherein the received metadata identifies the message received as a particular message containing the message identifiers associated with a selected number of prior messages in the message history stored in the data processing system;
   determining whether the message received contains the received metadata identifying the message received as the particular message using the received metadata;

responsive to a determination that the message received contains the received metadata, identifying each respective prior message, using the message identifiers, in the message history on the data processing system to form an identified number of messages; and displaying a presence of the identified number of messages in the message history on a display in the data processing system.

2. The computer-implemented method of claim 1, further comprising:

receiving user input from a dynamic selection from the number of messages in a second message history representative of a real-time communication at a second data processing system to form a selected number of referred-to messages wherein the user input from the dynamic selection from the number of messages in the second message history comprises:

a selection from the number of messages in the second message history; and a selection of a command to send the message;

identifying the number of message identifiers corresponding to the selected number of messages in the second message history; and sending the message to the data processing system from the second data processing system, wherein the message comprises the number of message identifiers and the metadata identifying the message as the particular message containing the message identifiers associated with the selected number of referred-to messages.

3. The computer-implemented method of claim 1, wherein the displaying step comprises one of:

presenting a graphical indicator associated with the identified number of messages;

automatically scrolling an existing message history window to a location of the identified number of messages; and presenting a window with the identified number of messages.

4. The computer-implemented method of claim 1, wherein the displaying step comprises:

splitting a window containing the message history into a first section and a second section;

displaying a most recent view in the first section; and displaying the identified number of messages in the second section.

5. The method of claim 1 further comprising selecting a number of messages as a referred-to message by selecting a menu option.

6. The method of claim 1 further comprising selecting a number of prior messages as referred-to messages by a mouse click.

7. The computer-implemented method of claim 3, wherein the presenting step comprises:

highlighting the identified number of messages.

8. The computer-implemented method of claim 3, wherein the graphical indicator is linked to the identified number of messages in the message history and further comprising:

responsive to a selection of the graphical indicator, displaying the identified number of messages.

9. A data processing system comprising:

a bus;

a display device connected to the bus;

a communications unit connected to the bus;

a storage device connected to the bus, wherein the storage device includes program code; and a processor unit connected to the bus, wherein the processor unit executes the program code to:

receive a message at a data processing system, wherein the message comprises a number of message identifiers and a received metadata, wherein each of the message identifiers uniquely identifies a respective prior message in a message history representative of a real-time communication, and wherein the received metadata identifies the message received as a particular message containing the message identifiers associated with a selected number of prior messages in the message history stored in the data processing system, determine whether the message received contains the received metadata identifying the message received as the particular message using the received metadata;

responsive to a determination that the message received contains the received metadata, identify each respective prior message, using the message identifiers, in the message history on the data processing system to form an identified number of messages; and display a presence of the identified number of messages in the message history on the display device in the data processing system.

10. The data processing system of claim 9, wherein in executing the program code to display the presence of the identified number of messages in the message history on the display in the data processing system, the processor unit executes the program code to present a graphical indicator associated with the identified number of messages.

11. The data processing system of claim 9, wherein in executing the program code to display the presence of the identified number of messages in the message history on the display in the data processing system, the processor unit executes the program code to automatically scroll an existing message history window to a location of the identified number of messages.

12. The data processing system of claim 9, wherein in executing the program code to display the presence of the identified number of messages in the message history on the display in the data processing system, the processor unit executes the program code to present a window with the identified number of messages.

13. The data processing system of claim 9, wherein in executing the program code to display the presence of the identified number of messages in the message history on the display in the data processing system, the processor unit executes the program code to:

split a window containing the message history into a first section and a second section;

display a most recent view in the first section; and display the identified number of messages in the second section.

14. The data processing system of claim 10, wherein in executing the program code to present a graphical indicator associated with the identified number of messages, the processor unit executes the program code to highlight the identified number of messages.

15. The data processing system of claim 10, wherein the graphical indicator is linked to the identified number of messages in the message history and wherein the processor unit further executes the program code to display the identified number of messages in response to a selection of the graphical indicator.

16. A computer program product for managing messages, the computer program product comprising:

a computer recordable storage device;

computer executable program code, stored on the computer recordable storage device, the computer executable program code comprising:

computer executable program code for receiving a message at a data processing system, wherein the message comprises a number of message identifiers and a received metadata, wherein each of the message identifiers uniquely identifies a respective prior message in a message history representative of a real-time communication and wherein the received metadata identifies the message received as a particular message containing the message identifiers associated with a selected number of prior messages in the message history stored in the data processing system, computer executable program code for determining whether the message contains the received metadata identifying the message received as the particular message using the received metadata;

computer executable program code responsive to a determination that the message received contains the received metadata, identifying each respective prior message, using the message identifiers, in the message history on the data processing system to form an identified number of messages; and computer executable program code for displaying a presence of the identified number of messages in the message history on a display in the data processing system.

17. The computer program product of claim 16, further comprising:

computer executable program code, stored on the computer recordable storage device, for receiving user input from a dynamic selection from a number of prior messages in a second message history representative of a real-time communication at a second data processing system to form a selected number of referred-to messages, wherein the user input from the dynamic selection from the number of prior messages in the second message history comprises a selection from the number of prior messages in the second message history and a selection of command to send the message;

computer executable program code, stored on the computer recordable storage device, for identifying the number of message identifiers corresponding to the selected number of messages in the second message history; and computer executable program code, stored on the computer recordable storage device, for sending the message to the data processing system from the second data processing system, wherein the message comprises the number of message identifiers and the metadata identifying the message as the particular message containing the message identifiers associated with the selected number of referred-to messages.

18. The computer program product of claim 16, wherein the computer executable program code, stored on the computer recordable storage device, for displaying the presence of the identified number of messages in the message history on the display in the data processing system comprises:

computer executable program code, stored on the computer recordable storage device, for presenting a graphical indicator associated with the identified number of messages.

19. The computer program product of claim 16, wherein the computer executable program code, stored on the computer recordable storage device, for displaying the presence of the identified number of messages in the message history on the display in the data processing system comprises:

computer executable program code, stored on the computer recordable storage device, for programmatically scrolling an existing message history window to a location of the identified number of messages.

* * * * *